(12) United States Patent
Sanders et al.

(10) Patent No.: US 7,971,885 B2
(45) Date of Patent: Jul. 5, 2011

(54) INFANT STROLLER ROCKING DEVICE

(75) Inventors: Anthony Jonathan Sanders, Newton Aycliffe (GB); Gavin Hancock, Durham (GB)

(73) Assignees: Sanders Associates Limited (GB); Benchmark Electronics Limited (GB)

( * ) Notice: Subject to any disclaimer, the term of this patent is extended or adjusted under 35 U.S.C. 154(b) by 472 days.

(21) Appl. No.: 12/093,622

(22) PCT Filed: Nov. 15, 2006

(86) PCT No.: PCT/GB2006/004259
§ 371 (c)(1),
(2), (4) Date: May 14, 2008

(87) PCT Pub. No.: WO2007/057663
PCT Pub. Date: May 24, 2007

(65) Prior Publication Data
US 2008/0314665 A1 Dec. 25, 2008

(30) Foreign Application Priority Data
Nov. 18, 2005 (GB) .................................. 0523521.3

(51) Int. Cl.
*B62B 9/22* (2006.01)
(52) U.S. Cl. ................. 280/47.1; 5/108; 5/109; 180/166
(58) Field of Classification Search .................. 180/166; 5/105–109; 280/47.1
See application file for complete search history.

(56) References Cited

U.S. PATENT DOCUMENTS

| 3,802,003 | A | | 4/1974 | Laureti | |
|---|---|---|---|---|---|
| 4,793,010 | A | * | 12/1988 | Gross et al. | 5/109 |
| 4,837,876 | A | * | 6/1989 | Levy | 5/107 |
| 5,002,144 | A | * | 3/1991 | McMahon | 180/166 |
| 6,298,949 | B1 | * | 10/2001 | Yang et al. | 188/20 |
| 6,519,792 | B2 | * | 2/2003 | Chen | 5/109 |
| 2003/0098562 | A1 | * | 5/2003 | Lerner et al. | 280/47.41 |
| 2004/0212161 | A1 | * | 10/2004 | Haigh | 280/47.1 |

(Continued)

FOREIGN PATENT DOCUMENTS

DE 19727173 A1 1/1999
(Continued)

OTHER PUBLICATIONS

International Search Report dated Feb. 6, 2007.
(Continued)

*Primary Examiner* — J. Allen Shriver, II
*Assistant Examiner* — James Triggs
(74) *Attorney, Agent, or Firm* — Moser IP Law Group

(57) ABSTRACT

A method of rocking a wheeled infant carrier (30) comprises using a rocking device (10) having a pair of discrete units (12,14). Each unit has a ground-engaging base (18$a,b$) and a platform (16$a,b$) supported thereon through bearings for movement relative to the base in a first direction. A drive one (12) of the units has a motor in a housing (20) arranged to drive the platform (16$a$) of the drive unit relative to its base back and forth in said first direction. A first wheel (34) of the carrier (30) is placed on the drive unit and a second wheel (32) on the second, slave unit (14), with the axes of rotation of the wheels being arranged parallel said first direction. The motor is operated to rock that end of the carrier that is supported by those wheels from side to side.

24 Claims, 8 Drawing Sheets

U.S. PATENT DOCUMENTS

2005/0140105 A1 * 6/2005 Hernandez ..................... 280/62

FOREIGN PATENT DOCUMENTS

| | | |
|---|---|---|
| EP | 415736 B1 | 1/1994 |
| FR | 2427238 A1 | 12/1979 |
| FR | 2638343 A1 | 5/1990 |
| FR | 2649872 A1 | 1/1991 |
| FR | 2651419 A1 | 3/1991 |
| GB | 2219199 A | 12/1989 |
| GB | 2231005 A | 11/1990 |
| WO | 8900942 A1 | 2/1989 |
| WO | 9523722 A1 | 9/1995 |
| WO | 2004062977 A1 | 7/2004 |
| WO | 2005084497 A1 | 9/2005 |

OTHER PUBLICATIONS

GB Search Report dated Jan. 26, 2006.
International Preliminary Report on Patentability issued on May 20, 2008 for PCT Application No. PCT/GB2006/004259.

* cited by examiner

INFANT STROLLER ROCKING DEVICE

This invention relates to a rocking device for infant strollers, prams buggies and other wheeled cots and the like and in which a baby or infant is carried and it is desired to rock the child to facilitate quiet sleep.

BACKGROUND

There are numerous patents disclosing various arrangements of this kind. GB-A-2219199 discloses a moveable frame oscillated back and forth over a smaller, stationary frame by a motor mounted on the stationary frame. A crib or infant carriage is placed on the moveable frame. WO-A-95/23722 discloses a frame supported off the ground on which a pram can be disposed and a mechanism is provided to rock the frame in different ways. EP-B-415736 discloses an arrangement having two receptacles for the front or back wheels of a pram, and these are rocked backwards and forwards.

GB-A-2231005 provides a housing supported on the ground and a single wheel holder for a stroller, which stroller is pulled backwards and forwards by a motor in the housing reciprocating the wheel holder relative to the housing.

WO-A-89/00942 and FR2427238 both disclose an elongate support for two wheels of a pram, or legs of a cot, and providing an undulating rocking motion. The French document suggests a slave unit for the other legs of a cot if these are not provided with wheels.

FR-A-2651419 and FR-A-2649872 disclose a plate on rails on a support and a motor to drive the plate back and forth on the support.

There are various problems with all these arrangements, some of which are that the stroller or pram may be lifted a significant step up off the ground. Should the pram come off them, it will roll off some way before stopping. Alternatively, if only one end of the pram is lifted, there is an increased risk of the pram tipping over. Strollers and buggies are usually designed so that only a small force is needed on rear handles to lift the front wheels off the ground, whereby steering of the buggy is facilitated. Consequently, substantial lifting by a rocking device may destabilise a stroller.

Another problem is that the rocking device frequently needs to "fit" the buggy or pram in question. Nowadays there are such a plethora of different shapes and sizes of buggy and stroller that no single device presently available is suitable for them all, at least, not if it is portable or does not have complicated adjustments. The wheel bases change, the wheel sizes, some are ganged together in pairs, close together, or spaced apart. Thus, some arrangements provide a platform on which an entire buggy or cot (eg GB2219199) is supported. Any buggy can be rocked by such a device, but the device is consequently not portable. Likewise, some arrangements provide for adjustments whereby different configurations may be catered for (eg WO2004/062977), but these arrangements are complicated.

The requirement for a rocking device is most frequently away from home. At home, children are often quite docile and ready to sleep at appropriate times, but it is when they are in strange neighbourhoods that a rocking device finds its usual application. Yet, many of the devices presently available are far from portable, and some even challenge transportability.

Furthermore, a potential problem with portable arrangements is that babies and their buggies are a significant weight and the energy required to move them, particularly with up and down movements, can be substantial, making batteries having a useful lifetime, (and which are needed for driving the unit when away from home), very heavy. Indeed, the friction between buggy wheels and a carpet, or grass or even a hard surface such as concrete or tarmac, can be such as to make the forces necessary to move a buggy backwards and forwards on its own wheels very significant, again using substantial amounts of power. This is particularly the case with some buggies/strollers that have both soft elastomer, and small size, wheels, so that rolling friction is not insignificant.

Indeed, the situation is often that, because the friction is so high, instead of oscillating the pram or buggy backwards and forwards, the rocking device simply oscillates itself backwards and forwards, using the buggy as an anchor. Obviously, for such a system to work, the device has to be secured in place, either by its own mass, or by connection to an immovable object. Some patents disclose systems where a pram is connected to a solid object and pulls it backwards and forwards on its own wheels.

Another issue is that, where the stroller or pram is rocked backwards and forwards on its own wheels, and this means that absolute confidence must be had in the system that the buggy will not roll off its support and roll away by itself. Bearing in mind that the purpose of these rocking devices is to remove the necessity of constant attention, people must have confidence that no danger will result from their use.

It is an object of the present invention to address these points and provide a rocking device that does not suffer from the afore-mentioned problems, or at least mitigates the effects of at least some of them.

BRIEF SUMMARY OF THE DISCLOSURE

In accordance with the present invention, there is provided a method of rocking a wheeled infant carrier comprising the steps of:

providing a rocking device for a buggy comprising a pair of discrete units, each unit comprising a ground engaging base and a platform supported thereon through bearings for movement relative to the base in a first direction, a drive one of the units having a motor arranged to drive the platform of the drive unit relative to its base back and forth in said first direction;

disposing a first wheel of the carrier on the drive unit and any second wheel of the carrier that substantially shares the same axis of rotation as the first wheel on the second, slave unit, wherein the axes of rotation of said first and any second wheel are arranged parallel said first direction; and operating said motor to rock that end of the carrier that is supported by said first and any second wheel from side to side.

With this arrangement, there is no tendency in the rocking movement to roll the pram or buggy in the direction of rotation of its own wheels. Consequently, even if the buggy was somehow to fall off the rocking device, it has no momentum in the direction of its wheel alignment that might carry it off.

By providing an arrangement where the only substantial movement of the buggy is through wheels that are supported on platforms which are themselves supported on linear bearings, the friction that has to be overcome is minimised. For example, a typical three-wheeled off-road buggy weighs 10.5 kg. A large three-year-old child weighs 18.6 kg (90th percentile boy, USA). With the child in the buggy, the force needed to lift a wheel is 58 N (front,×1) or 114 N (rear×2). The force required to pull the buggy forward on carpet is about 23 N. The force required to push the buggy sideways at the rear, however, when it is supported on linear rolling bearing units is only about 2.5 N (and half that if only the front wheel is moved sideways). Consequently, both the motor and battery power required are small, making such a unit easily portable.

It is evident from the forgoing that, in the case of three-wheeled buggies where said first wheel is the apex wheel, there is no second wheel sharing the same axis of rotation as the apex wheel, and consequently said second, slave unit is not employed. However, even with three-wheeled buggies, assuming the apex wheel is a single front wheel (as is presently usually the case), the method can be employed using both units by disposing the paired rear wheels on the units.

Although not essential, said first or second wheel may the wheel or wheels of the carrier that are provided with a brake and said method may then further comprise the step of applying said brakes when disposing said wheels on the first and second units. This may have the disadvantage of causing unnecessary stresses on the device or buggy if the movements resulting from the operation of the motor would otherwise cause rolling of the braked wheels on the platforms. This can be minimised by aligning the drive unit, and the slave unit where used, with the direction of oscillation of the buggy.

In fact, although it is preferred that the bearings are linear, an alternative arrangement is to provide bearings that are curved to allow the platform to move in an arc over the base. Ideally, in this event, the arc has a radius of rotation approximately equal to the wheel base of the carrier. Then, it would be possible to apply the brakes to the, or each, wheel supported on the units of the device without any frictional stresses being imposed by the movement of the device. Nevertheless, as stated above, linear bearings are preferred since these are less complicated and less susceptible to malfunction, and in any event, there is no requirement for braked application since the device would, in any event, generally only be employed on flat ground.

With a three-wheeled buggy as described above, the deployment of the device with both rear wheels supported on a drive and slave unit respectively may be preferred. This is because the brakes of three-wheeled buggies (indeed of four-wheeled buggies also) tend to be on the back wheels for ease of access by the user (who is generally pushing buggies and prams from the rear). Consequently, bearing in mind the points made above, the brakes could be applied with this deployment. However, in the case of three-wheeled buggies, even if it is the front wheel that has the brake for the buggy, it can be applied when it is the rear wheels that are supported on the first and second units. This is because the front wheel in this scenario only has to pivot about its contact point with the ground, and does not require to roll. Consequently, of course, the brakes of a buggy cannot be applied if they interfere with this rolling, at least not without causing undesirable stresses and friction.

It will also be apparent that, with four-wheeled-buggies, and the front, or back, moving from side to side on the drive and slave units, the other pair of wheels make small back and forth movements, alternating with one another, as the buggy as a whole oscillates rotationally about a vertical axis. Ideally, one wheel of the carrier has a brake and the braked wheel is then arranged to be one not supported by a unit. Then, even with four-wheeled buggies, the braked wheel becomes a pivot wheel and the centre of rotation of the buggy is around the pivot wheel. The wheel on the same axis as the pivot wheel then rolls back and forth during the oscillation, the wheel in line with the pivot wheel moves sideways only (remaining stationary (other than some pivoting about a vertical axis) relative to the platform on which it sits) and the fourth wheel, diagonally opposite the pivot wheel, not only moves sideways relative to the base of the unit on which it sits, but also rolls backwards and forwards slightly on the platform on which it is supported. Moreover, since many buggies and strollers have at least one pair of wheels as casters, that is to say, mounted on axles that are freely pivotable about a vertical axis that is offset with respect to the axle, such pivoting is relatively frictionless.

In fact, with four-wheeled buggies, it is most likely that one of the wheels not supported by the units will always form a pivot wheel, at least when neither of them is braked. Which wheel adopts the pivot position and which rolls will depend on which has the greater loading, and hence greater resistance to rolling.

In any event, the backwards and forwards motion on the platform is slight, and only sufficient to accommodate the sideways motion (preferably about 50 mm in amplitude) of that end of the carrier supported on the unit(s). Indeed, a certain amount of to and fro movement is inevitably required of the wheels on the platforms. Preferably the platforms are flat in a direction transverse said first direction and have upstanding walls spaced apart and parallel said first direction to retain a wheel on the carrier from rolling off the platform. Preferably, ridges are disposed on the top surface of the platform transverse said first direction to improve friction between the wheel and platform in said first direction.

In another aspect of the present invention, there is provided a rocking device suitable for implementing the method described above, which device comprises a pair of discrete units, each unit comprising a ground engaging base and a platform supported thereon through bearings for movement relative to the base in a first direction, a drive one of the units having a motor arranged to drive the platform of the drive unit relative to its base back and forth in said first direction. Preferably said platform is flat between spaced walls disposed on the platform and arranged parallel said axis, and has friction enhancers transverse said axis.

Preferably, the platform of said drive unit incorporates a housing at one end of the platform, said housing receiving the motor. Preferably, the motor is arranged with its rotational axis perpendicular to the platform and includes a crank having a pinion received in a slot in the base so that, as the crank is rotated by the motor, the platform is oscillated back and forth over said base. Preferably a gearbox is interposed between said crank and motor to reduce the speed of rotation of the crank relative to the motor.

Preferably the motor is a dc motor, an electrical supply socket being disposed in said housing for connection thereto of one of a battery pack or a mains dc transformer output. Preferably, said battery pack is chargeable using said mains dc transformer output.

Preferably, said base and platform of each unit each have a pair of facing parallel tracks, a ball cage being disposed between them and capturing at least four balls, two each between each of said facing tracks. Preferably, there are six balls, with three in each track.

Preferably, said platform has depending bosses extending through slot guides in the base disposed parallel to said tracks, retaining plates being fixed to said bosses on the other side of said base and bearing against rear faces of said guide slots to retain said platform and base in contact with one another while permitting relative movement of said base and platform with respect to one another in said first direction.

Preferably, said base has upstanding ridges in the top surface of which is disposed said slot guides. Preferably, a grip mat is adhered or otherwise fixed to an underside of said base.

Preferably, the base has a base cover connected thereto and spaced therefrom and provided with an aperture having an upstanding lip, which aperture is sized to fit said ball cage within its range of movement. Preferably, said platform has a depending lip spaced closely from said base cover, which cover is sized to exceed the size of the platform throughout its entire range of movement relative to the base. The upstanding lip of the base cover, in association with the covering thereof by the platform with its depending lip, ensures that there is only a labyrinthine path for dust and dirt to find its way to the bearings. The upstanding lip should also prevent liquid spillages (such as infant drinks) from getting to the bearings.

Indeed, the platform being smaller than the base means that, as the platform moves over the base there is a constant, unchanging clearance between them. This avoids the possibility of any finger-trapping by inquisitive children.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF THE DRAWINGS

An embodiment of the invention is further described hereinafter, by way of example, with reference to the accompany drawings, in which.

DETAILED DESCRIPTION

Figure 1:
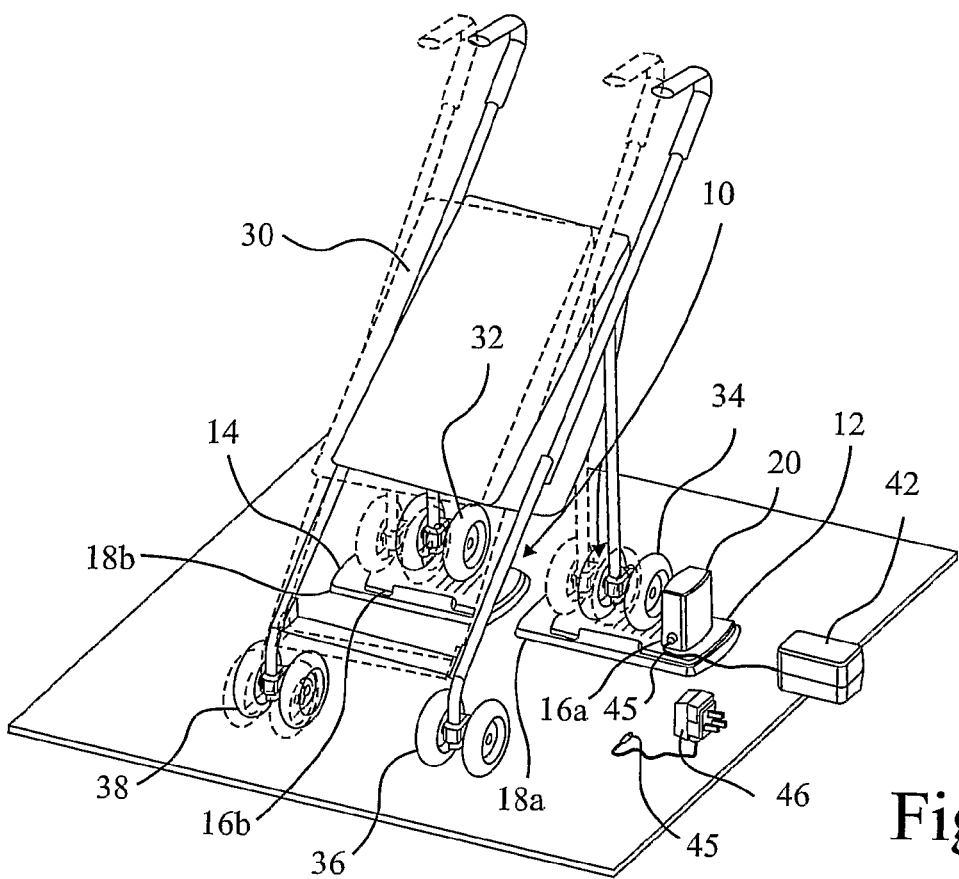
FIG. 1 is a perspective view of an embodiment of the invention in use with the rear wheels of a four-wheeled stroller.

For the avoidance of doubt, the terms "buggy", "stroller", "pram" etc are used herein interchangeably and refer to any wheeled infant carrier, including a cot or bed provided with wheels.

FIGS. 1 to 6 show a rocking device 10 in accordance with the present invention. The device 10 comprises a drive unit 12 and a slave unit 14. Both have similar constructions comprising a platform 16a,b and a base 18a,b. As explained further below, each platform is arranged to be freely translatable back and forth over the respective base. In the case of the slave unit 14, the platform 16b is simply free to move back and forth over the base 18b. However, with the drive unit 12, the platform 16a is provided with a housing 20 for a motor which is arranged to drive the platform 16a back and forth over the base 18a.

Figure 2:
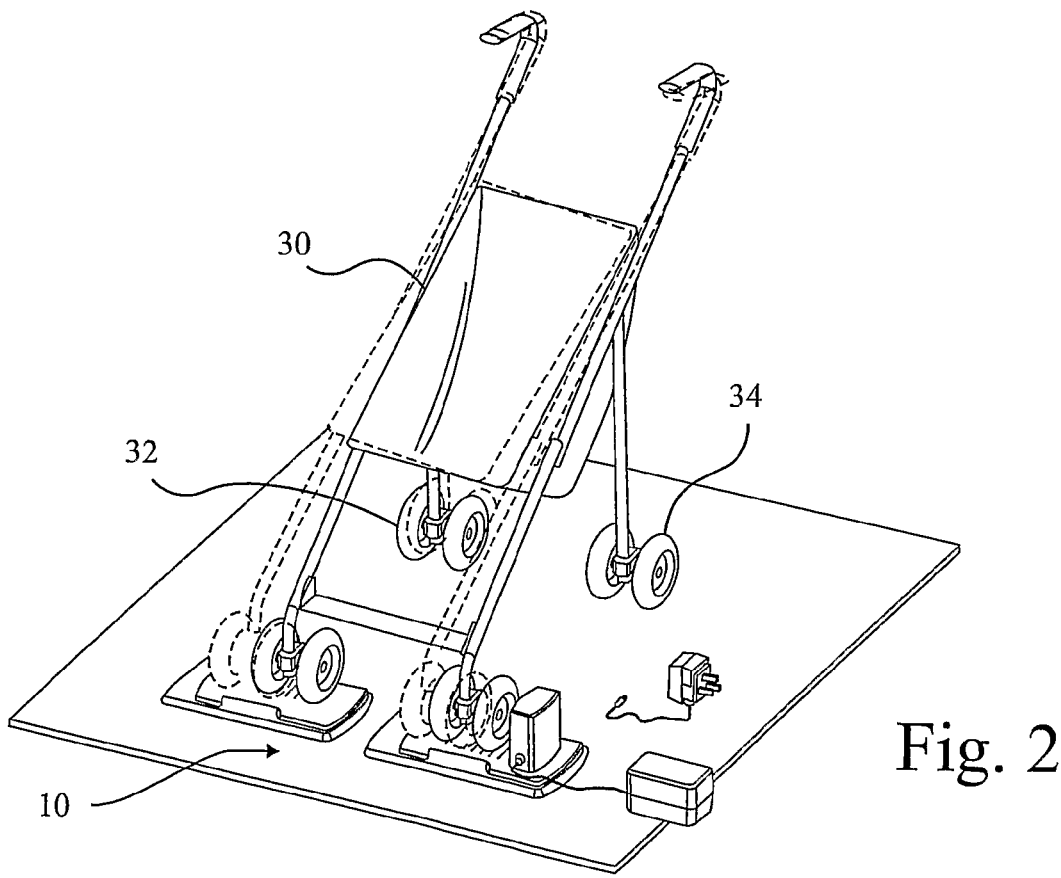
FIG. 2 is a similar view with the front wheels being used with the rocking device of the present invention.

In FIGS. 1 and 2, a four wheeled buggy 30 is shown, with its rear wheels 32,34 supported respectively on the platforms 16b,a of the slave unit 14 and drive unit 12. When the motor in housing 20 is operated, the platform 16a is oscillated from side-to-side moving the rear wheel 34 and hence the rear end of the buggy 30, from side-to-side. The rear wheel 32 is able to follow this movement by its support on platform 16b of slave unit 14, which is arranged so that its platform 16b is translatable in the direction being driven by the platform 16a transmitted by the body of the buggy 30.

Figure 12A:
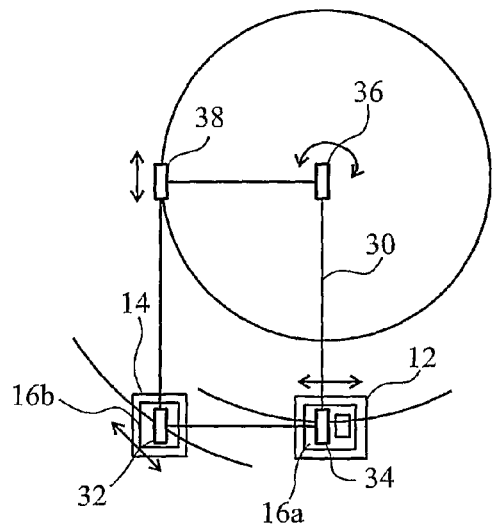
FIGS. 12a-e are plan views showing the rotational movements of a stroller in different configurations.

Of the two front wheels, one 36 forms a pivot wheel that is essentially stationary, while the other 38 rolls backwards and forwards slightly. This position is shown geometrically in a FIG. 12a. In this, the motion caused by the drive unit 12 is circular about the pivot wheel 36. Therefore all movements of the other wheels 32,34,38 are in necessarily in arcs about the pivot wheel 36. Thus, front wheel 36 merely pivots around its contact with the ground. Indeed, since at least one of the front and rear wheels of buggies and strollers tend to be arranged as castors (that is to say, having freedom to rotate about an axis which is vertical and in front of the wheel axis itself), this pivoting is a low friction movement. The other front wheel 38 can be seen to oscillate backwards and forwards in the direction of roll of the wheel 38. It therefore needs no further support, although the drive must overcome the rolling resistance of that wheel over the movements that it makes. Rear wheel 32 moves in a diagonal direction over the ground (at least, diagonal in relation to the movement of the other three wheels), and this movement is provided partly by a lateral movement by virtue of the platform 16b moving over the base 18b, and partly by roll of the wheel 32 on the platform 16b. Finally, the wheel 34 has a purely lateral movement accommodated by the movement of the platform 16a.

Thus the only significant rolling movement of the buggy 30 is of just one wheel in contact with the normal ground. One wheel merely pivots; one wheel rolls only slightly, and then over the hard smooth plastics (being the most likely material of construction) surface of the platform 16b (indeed, even that slight rolling could be eliminated, either by inclining the orientation of the slave unit, or providing for an arcing movement of the platform 16b—discussed further below). The last wheel makes no movements at all. Of course, there is frictional forces to overcome in the bearings supporting the platforms 16a,b on their respective bases 18a,b, but this can easily be arranged to be negligible. Consequently, the energy required to effect this rocking is small.

Turning to FIG. 2, an alternative layout is shown in which the rocking device 10 is here used with the front wheels of the buggy 30. Indeed, it is common for such buggies 30 to be provided with a single brake, or with independent dual brakes on the rear wheels 32,34. Thus, in FIG. 2, the brake on rear wheel 34 could be applied. Nevertheless, even without any brakes being applied, the security of the arrangement is no different than if the buggy was on an ordinary flat surface. Indeed, as is explained further below, the increase in height of the front wheels of the buggy above the ground is no more than about 20 mm (preferably less than 30 mm, in any event) and consequently there is little or no risk of tipping over of the buggy by disposing its front wheels on the rocking device 10.

Figure 3:
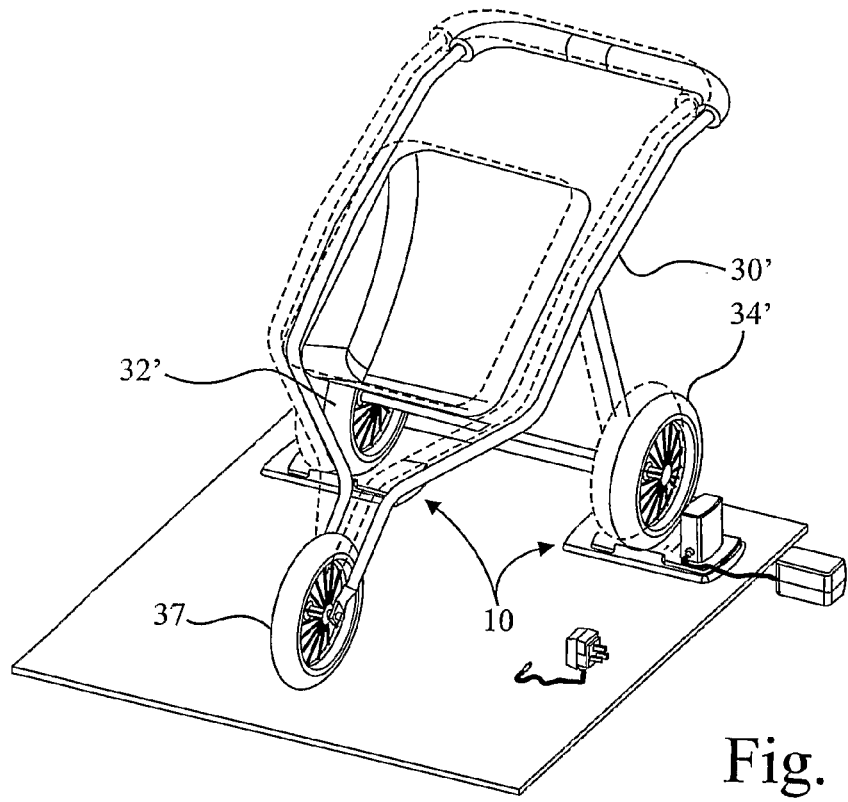
FIGS. 3 and 4 are similar views showing the device of FIGS. 1 and 2 in use with a three wheel stroller.
Figure 4:
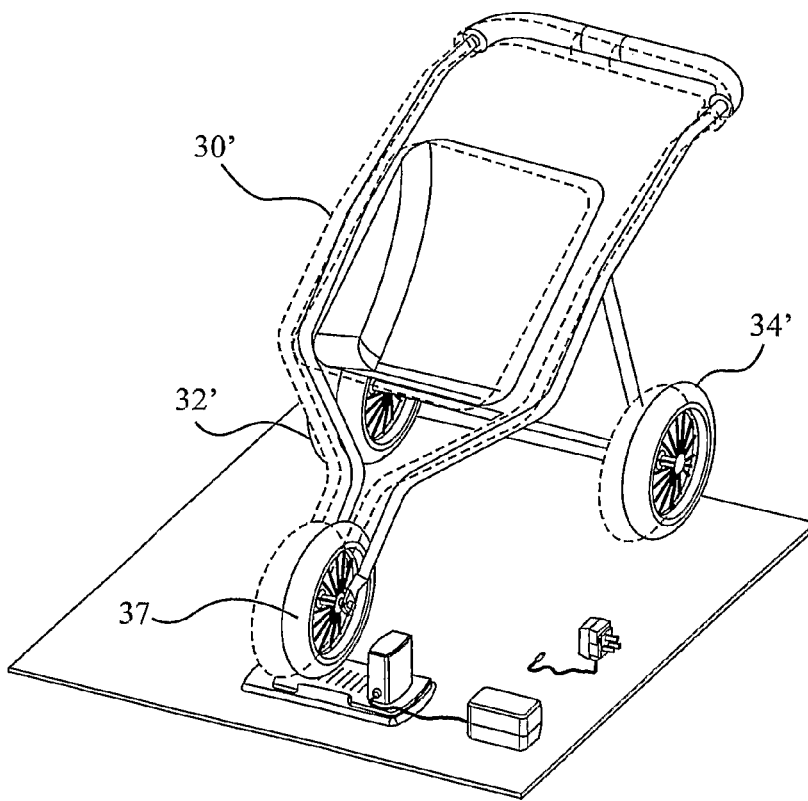

Turning to FIGS. 3 and 4, a similar arrangement is shown, but here with a three-wheeled buggy 30'; in FIG. 3a the rocking device 10 being deployed under rear wheels 32',34', and in FIG. 4 under a front wheel 37.

In FIG. 3, the front wheel 37 forms the pivot wheel, whereas in FIG. 4, one of the rear wheels, for example wheel 32' forms the pivot wheel, the other oscillating by rolling backwards and forwards. Indeed, two options are feasible as shown in FIGS. 12d and e.

Figure 12B:
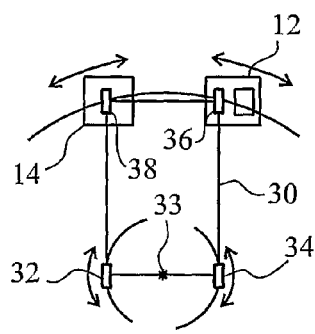
Figure 12C:
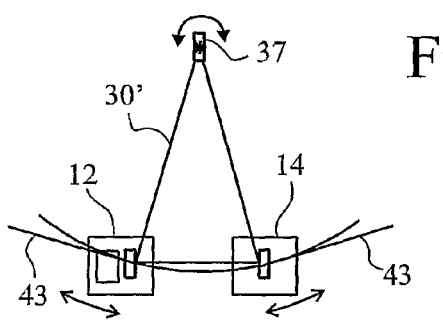
Figure 12D:
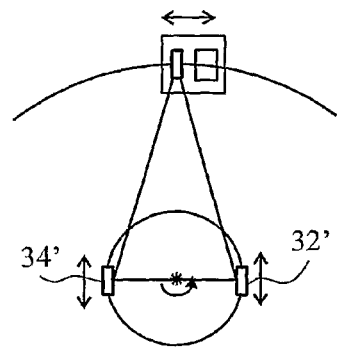
Figure 12E:
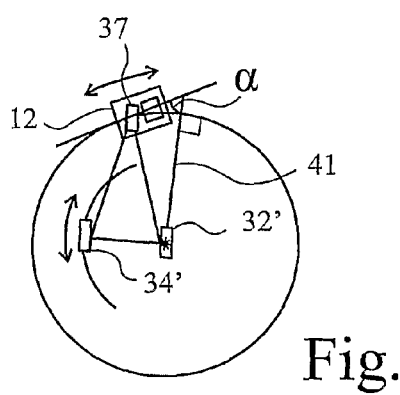

FIG. 12e shows the position of FIG. 4 where the rear wheel 32' forms the pivot wheel, wheel 34' simply rolls backwards while the front wheel 37 oscillates from side-to-side. Indeed, the drive unit 12 could be arranged at some angle α to the normal 41 (the normal 44 being parallel to and passing through the wheel 32') so that there is no rolling movement of the pivot wheel 37 on the platform of the drive unit 12.

FIG. 12d shows the other possibility where no wheel forms a stationary pivot wheel. Instead, both rear wheels 32',34' oscillate back and forth about a centre between them. This can be arranged by the angle α being zero here.

FIG. 12c shows the arrangement described above with reference to FIG. 3 where the apex wheel 37 of the three-wheeled buggy 30' forms the pivot wheel, and the drive and slave units 12,14 oscillate the rear end of the buggy around an arc centred on the pivot wheel 37. Again, the drive and slave units 12,14 could be angled to align more exactly with the tangents 43 to the arc centred on apex wheel 37. This will then reduce the rolling movement of the wheels 32',34' on the platforms 16a,b and therefore the frictional resistance of the arrangement.

Figure 5:
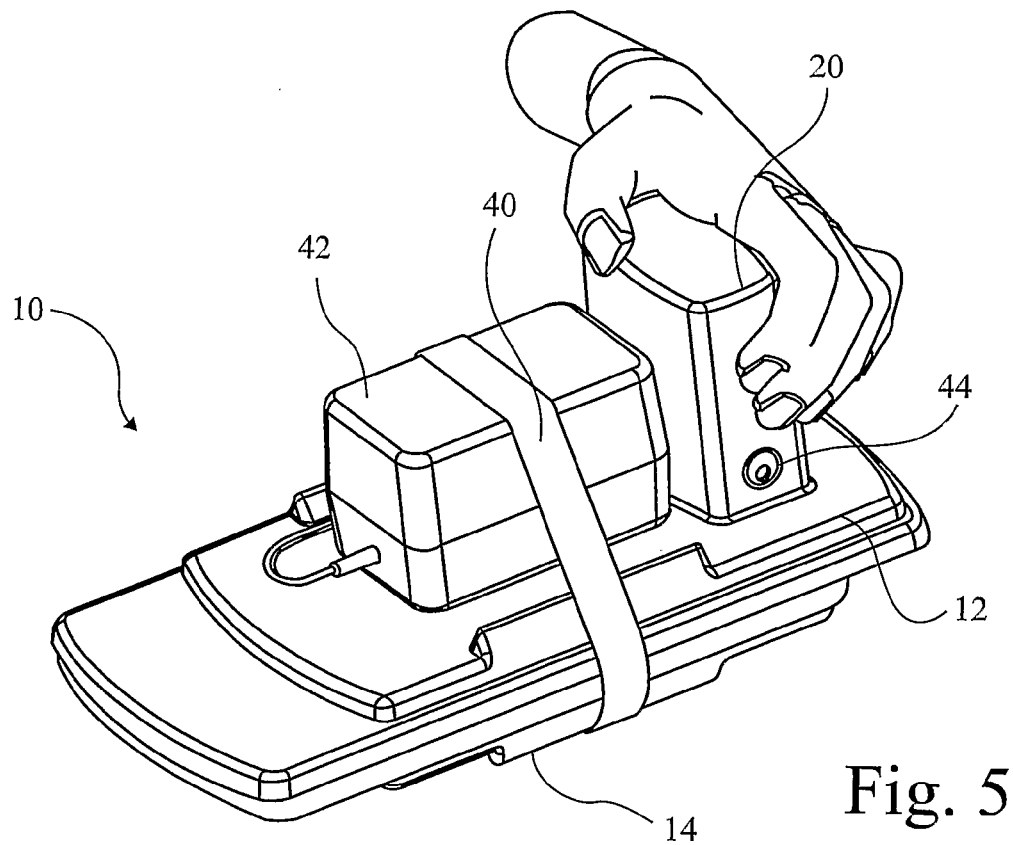
FIGS. 5 and 6 show the two units of the embodiment strapped together for transportation.
Figure 6:
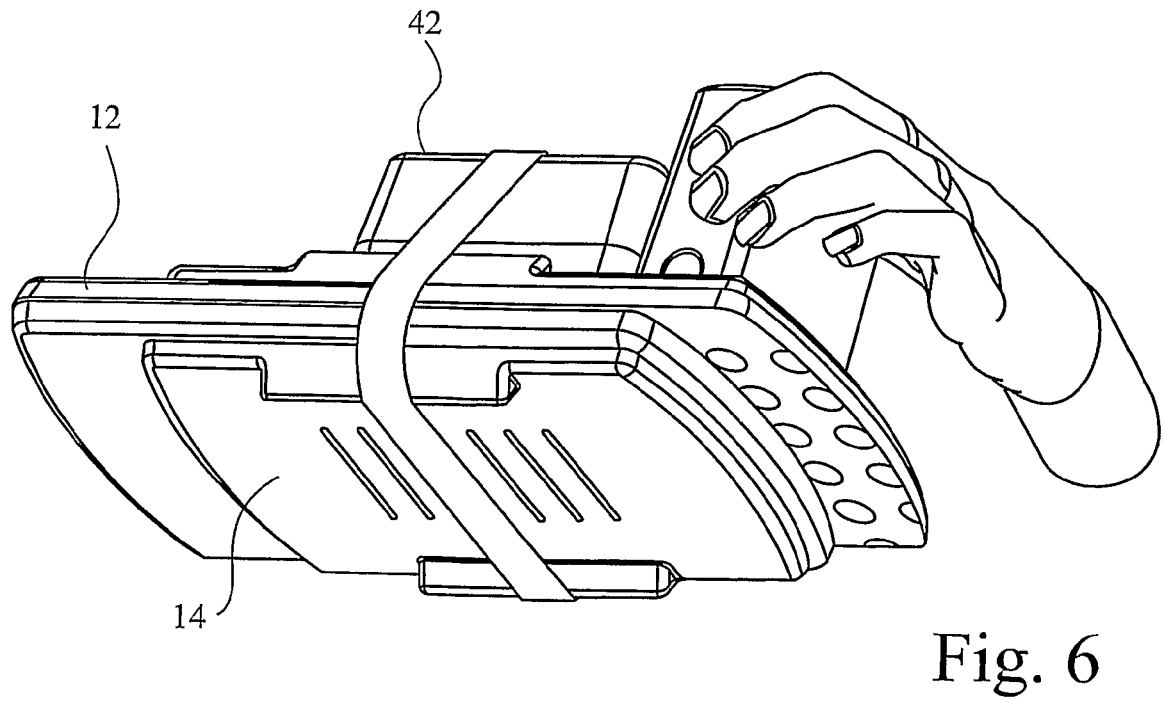
Figure 7:
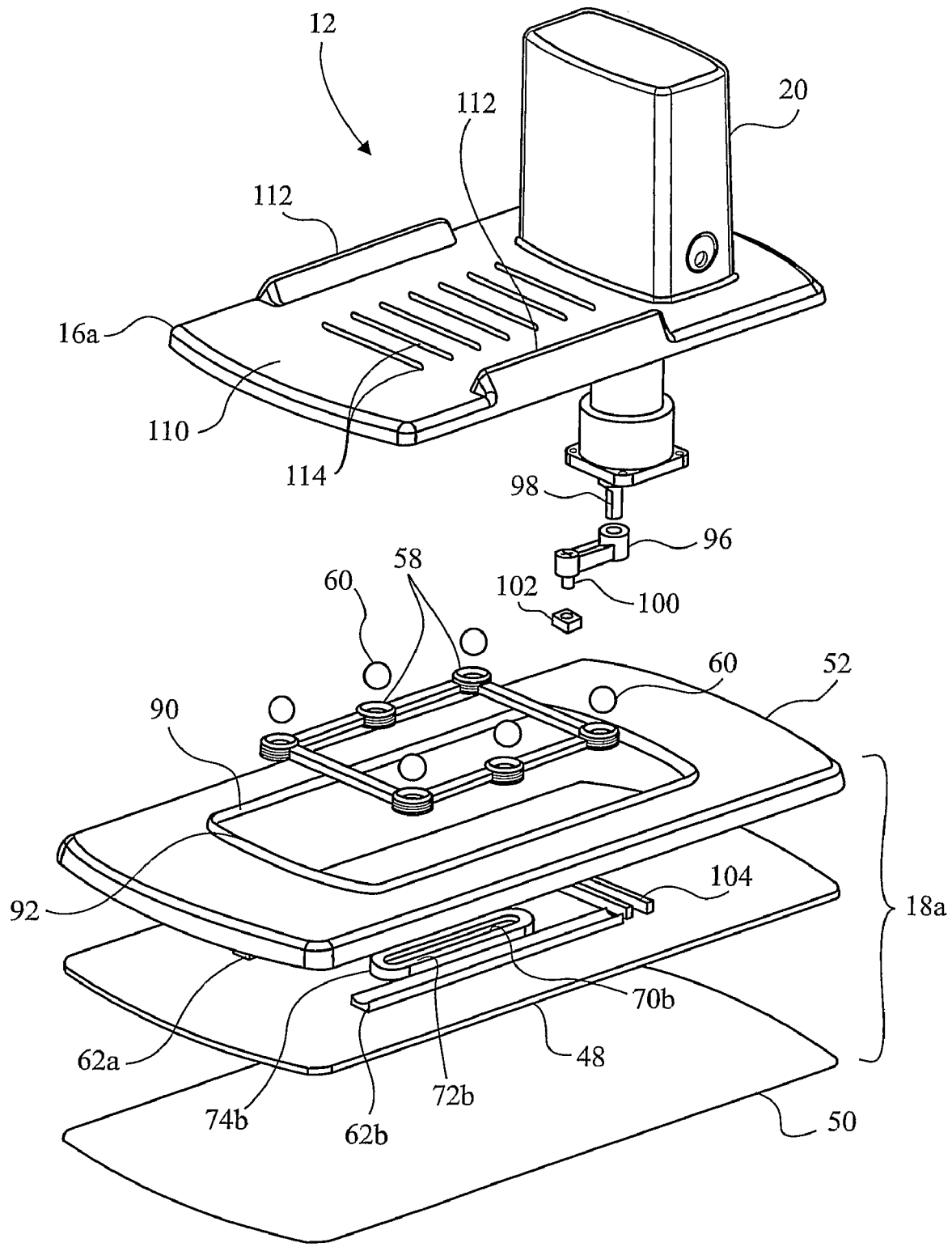
FIGS. 7 and 8 are exploded views of an embodiment of the invention.
Figure 8:
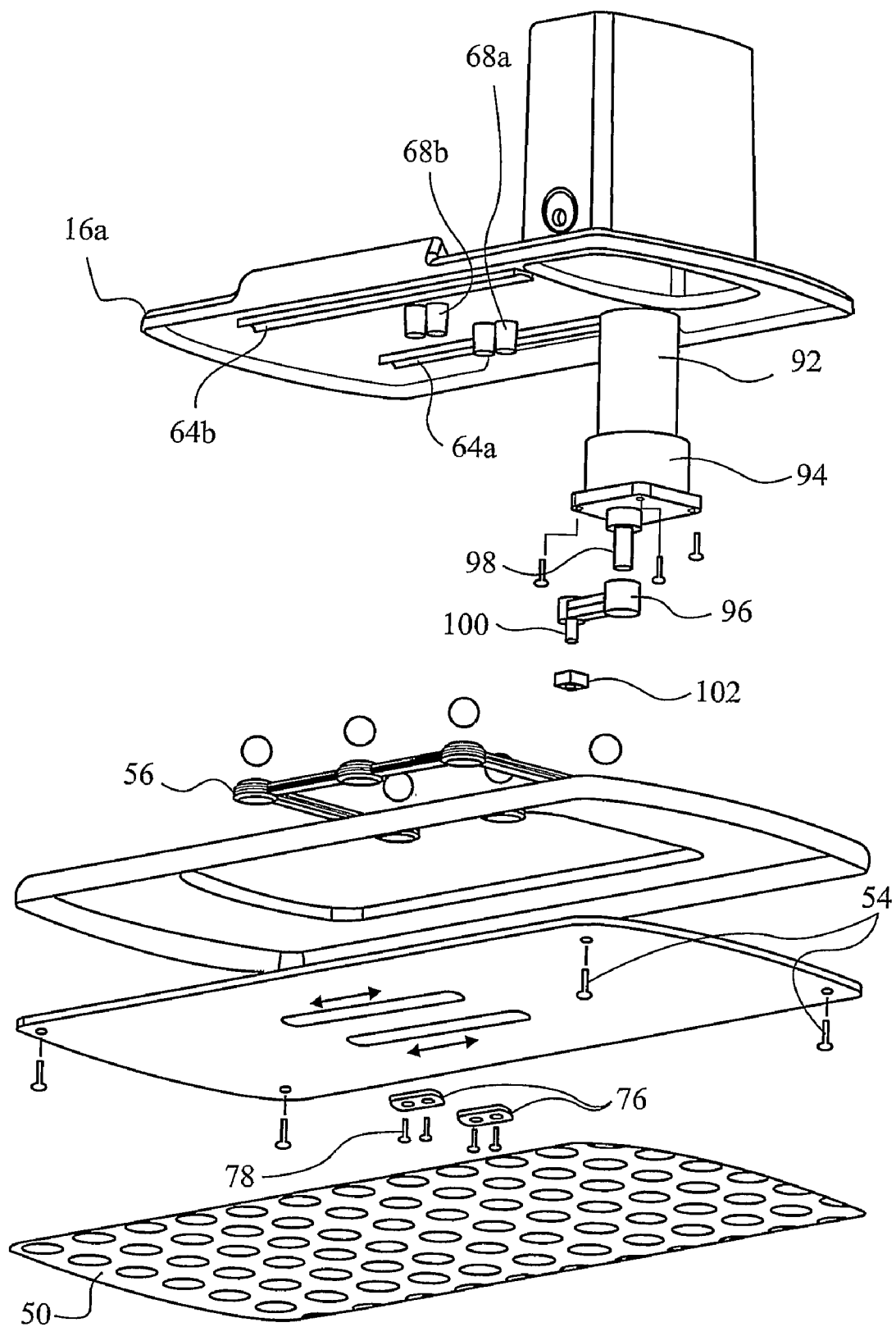
Figure 9:
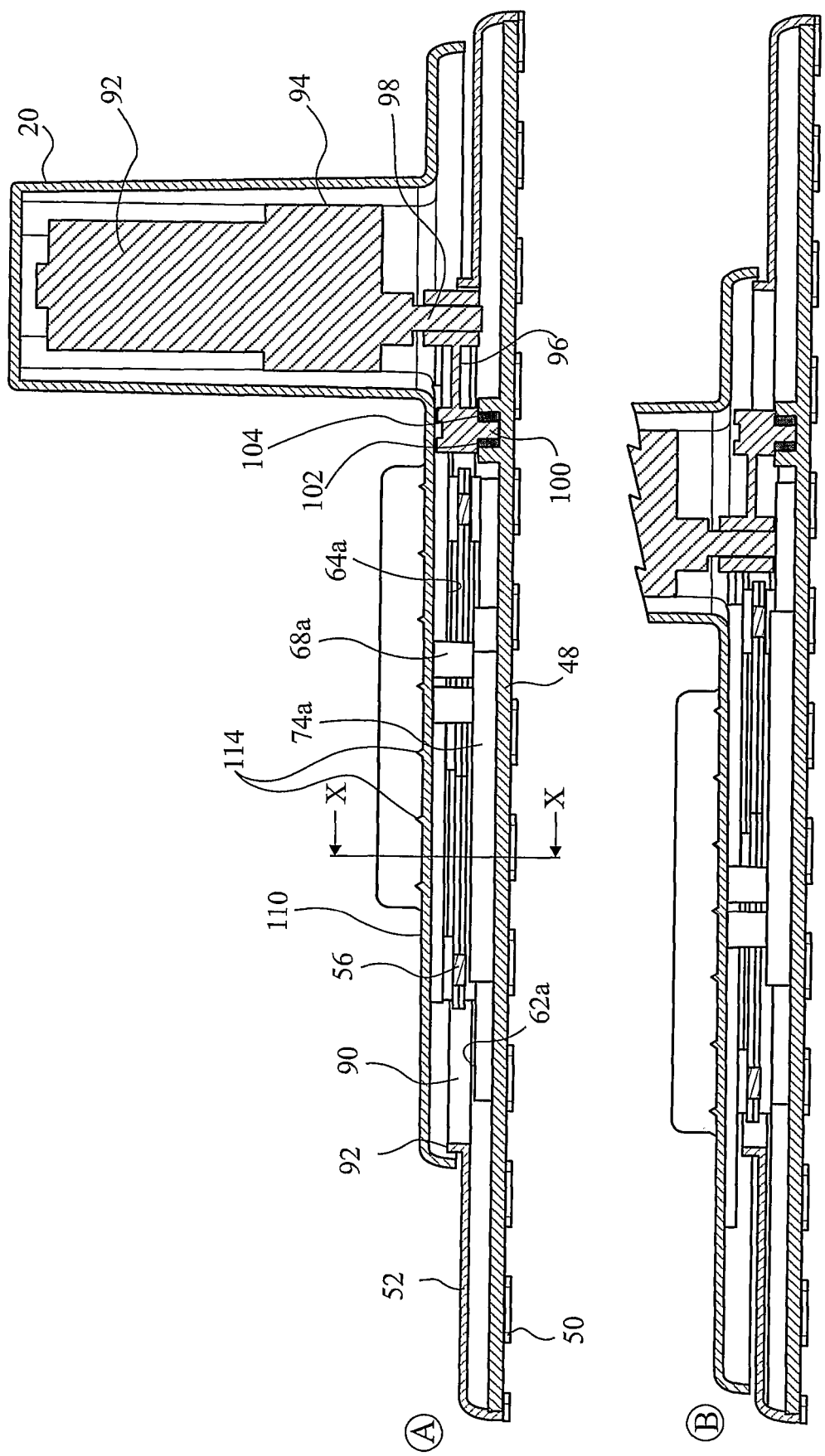
FIG. 9 is a longitudinal section, in two views of a drive unit of an embodiment of the invention.
Figure 10:
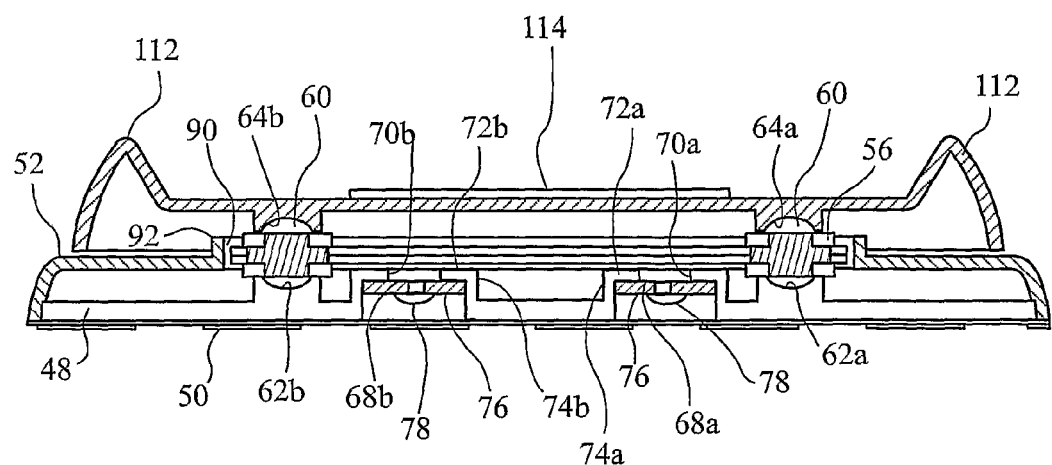
FIG. 10 is a section along the line X-X in FIG. 9.
Figure 11:
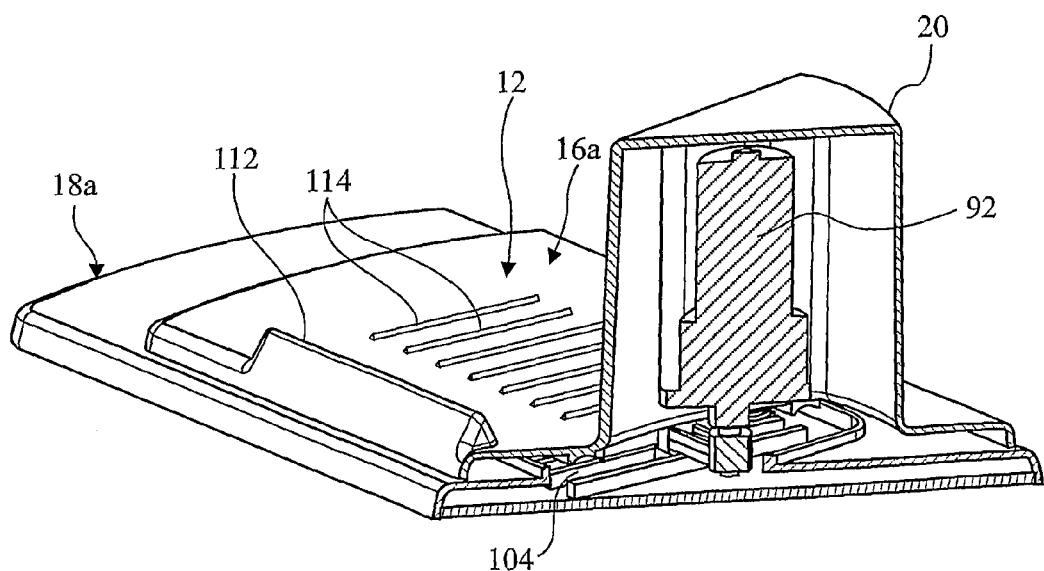
FIG. 11 is a perspective view of an angled section of the drive unit.

FIGS. 5 and 6 show how the drive unit 12, and slave unit 14 can be placed base to base and retained together as a unit by a rubber band 40. In this respect, it should be stated that the motor in the housing 20 is preferably a DC motor, being powered either by a battery pack 42 (through a socket 44 disposed on the housing 20), or by a mains adaptor 46 (see FIGS. 1 to 4). Ideally, the mains adaptor 46 can be employed also to charge the battery pack 42. In FIGS. 5 and 6, the battery pack 42 is shown wrapped with the drive unit 12 and slave unit 14, it being assumed that the mains unit 46 is left at home. Thus it can be seen that the compact arrangements of FIGS. 5 and 6 are easily portable. Indeed, the anticipated weight of the arrangement can be kept to less than about 2 kg, and preferably less than about 1 kg, so that carrying the device, for example in the carry tray or pocket normally provided on buggies is not problematic.

Turning to FIGS. 7 to 11, a drive unit 12 is illustrated. The platform 16a is a single plastics moulding whereas the base 18a is a composite of a base plate 48, a grip mat 50 adhered to the underside of the base plate 48 through the agency of a suitable adhesive (not shown), and a cover plate 52. The base plate and cover plate are held together by screws 54. A ball cage 56 comprises a plastic moulding having six annular recesses 58 adapted to receive ball bearings 60 in a close, but freely sliding, fit. The bearing 60 are arranged in two rows of three between a pair of tracks 62a,b on the base plate 48 and corresponding tracks 64a,b on the underside of the platform 16a (see FIG. 8).

Two elongate boss pairs 68a,b depend from the platform 16a between the tracks 64a,b. These extend through guide slots 70a,b formed in the top faces 72a,b of upstanding folds 74a,b of the base plate 48.

When assembled, the bosses 68a,b protrude through the guide slots 70b and the platform 16a is supported on the balls 60 through the cooperating faces of the tracks 62a,b, 64a,b. This enables the platform to roll with low friction on the base 18a within limits dictated by the length of the guide slots 70b and the boss pairs 68a,b.

To retain the platform and base together, retainer plates 76 are secured to the undersides of boss-pairs 68a,b by screws 78, the plates 76 being too large to pass through the guide slots 70a,b. To improve the grip of the base plate 48 on the ground, as mentioned above, a rubber grip mat 50 is provided. The base cover or top 52 is provided with a window 90 having an upstanding lip 92. The window 90 is sized to accommodate the ball cage 56 and its movement along the tracks 62a,b.

The arrangement is very flat. That is to say, the height over which the buggy's wheels are raised by the device 10 is small, amounting to little more than the thickness of the platforms and bases and the ball bearings between them. Indeed, that height need be no more than about 20 mm, preferably between 15 and 20 mm, so that the elevation of just one end of the buggy does not risk overbalancing of the buggy to any significant extent, and certainly not when a child is carried by the buggy.

The motor housing 20 has mountings (not shown) to receive a DC motor 92 that drives a gearbox 94. The output of the motor and gearbox may be between 20 and 100 revolutions per minute. Indeed, the power option enables the final output speed to be user regulated, if desired. A crank 96 is disposed on the end of output shaft 98, an offset crank pin 100 being received in a sliding block 102. The block 102 is arranged to fit in a guide slot 104 arranged transversely of the tracks 62a,b in the base plate 48. As the motor 92 rotates, the crank pin 100 drives the platform with a sinusoidal motion (caused by sliding of the block 102 in the guide slot 104) back and forth along the tracks 62a,b 64a,b which, between them, define a first direction of movement. The amplitude of the oscillation is determined by the length of the crank 96, and this may be 25 mm in length so that the end to end movement may be 50 mm.

Platform 16a has a substantially flat surface 110 and two upstanding retaining walls 112 arranged parallel the tracks 62,64. The walls 112 are to prevent the wheels of the infant carrier 30,30' from rolling off the platform. Since prams and buggies come in many different shapes and sizes, with many different sizes and arrangements of wheels, it is impossible to guarantee applicability to every arrangement. However, it is presently proposed to have the walls 112 to a height of 10 mm and separated by about 130 mm, so that wheels of diameter 250 mm can be accommodated without touching both walls simultaneously. Of course, the walls 112 are essentially spaced sufficiently to allow between 10 and 15 mm of backward and forward roll of the wheels between the walls. Likewise, the width of the platform must be sufficient to accommodate ganged multi-wheels, as is commonly employed, and therefore is preferably about 200 mm long. Indeed, it is an aspect of the present invention that there is no constraint against movement placed on the wheels of the buggy supported by the platforms, at least not other than the end walls 112.

To improve lateral grip on wheels supported on the surface 110 of the platform 16a it is provided with ridges 114 transverse the direction of the tracks 62,64.

The power arrangements of the present invention are beneficial in a number of respects. Firstly, no switch is provided that may be interfered with by a child. Turning on and off is simply achieved by plugging in, or taking out, a plug-connector 45 provided on the end of a wire from the battery pack 42 or ac mains adapter 46. This also gives the possibility of intervention of a control unit (not shown). Such a unit could have a socket (identical to the socket 44 on the housing 20) and a wire and plug (identical to the plug 45). The socket would be to receive power from the battery pack 42 or ac mains adapter 46, and the plug would be to transmit power to the motor in the housing 20. However, that power could be regulated, for example by speed or duration, under the control of the control unit. It could be activated by sound. It could additionally play music or other sounds, or any combination. Indeed, multiple control units could be implemented in series having different functions.

Finally, turning to FIG. 12, some of the configurations discussed above of use of the present invention are disclosed. In FIG. 12a, both the drive and slave units 12,14 are employed under wheels 32,34 of the buggy 30, with wheel 36 forming a pivot point. Although the slave unit 14 is shown directly aligned with the drive unit 12, there is nothing to prevent it being angled slightly to better coincide with the tangent to the arc centred on the pivot wheel 36. Although the pivot wheel 36 is here on the same side as the drive unit 12, there is nothing to suggest that the pivot wheel could not be on the opposite side to the drive unit. Indeed, this would certainly be the arrangement developed by the arrangement if the diagonal wheel (38) to the drive unit was the one that was braked, the other wheel being free.

In FIG. 12b, neither wheels 32,34 are braked and consequently the centre of rotation may be about an intermediate point 33 between them where they each make complimentary back and forth oscillations while the other end of the buggy 30 oscillates from side to side. Again, the drive and slave units 12,14 could be angled to better approximate the tangent to the arc centered on point 33 where the wheels 36,38 are supported on the units 12,14.

In fact there is nothing to prevent the tracks 62,64 from being curved, so that instead of a linear motion, the platform 16a makes an arcing movement with respect to the base. However, since the radius of the arc that is required depends on the dimensions of the buggy, this presupposes knowledge of the wheel base of the buggy.

The invention claimed is:

1. A method of rocking a wheeled infant carrier comprising the steps of:
   providing a rocking device for a buggy comprising a pair of discrete units, each unit comprising a ground engaging base and a platform supported thereon through bearings for movement relative to the base in a first direction, a drive one of the units having a motor arranged to drive the platform of the drive unit relative to its base back and forth in said first direction;
   disposing a first wheel of the carrier on the drive unit and any second wheel of the carrier that substantially shares the same axis of rotation as the first wheel on the second, slave unit, wherein the axes of rotation of said first and any second wheel are arranged parallel said first direction; and
   operating said motor to rock that end of the carrier that is supported by said first and any second wheel from side to side.

2. A method as claimed in claim 1, in which said first or second wheel is or are the wheels of the carrier that are provided with brakes and said method further comprises the step of applying said brakes when disposing said wheels on the first and second units.

3. A method as claimed in claim 1, in which one wheel on the carrier has a brake and only that brake is applied.

4. A method as claimed in claim 3, in which the braked wheel is not said first or second wheel and becomes a pivot wheel, the centre of rotation of the buggy being around the pivot wheel.

5. A method as claimed in claim 4, in which said pivot wheel is in the form of a caster, mounted on an axle that is freely pivotable about a vertical axis that is offset with respect to the axle, such pivoting being relatively frictionless.

6. A method as claimed in claim 1, in which said carrier has three wheels, wherein said first wheel is the apex wheel, there being no second wheel sharing the same axis of rotation as the apex wheel, and consequently said second, slave unit is not employed.

7. A method as claimed in claim 1, in which said carrier has three wheels, wherein said first wheel is not the apex wheel.

8. An infant carrier rocking device, suitable for implementing the method as claimed in claim 1, which device comprises a pair of discrete units, each unit comprising a ground-engaging base and a platform supported thereon through bearings for movement relative to the base in a first direction, a drive one of the units having a motor arranged to drive the platform of the drive unit relative to its base back and forth in said first direction, which direction is parallel said base.

9. A device as claimed in claim 8, in which said platform is flat between spaced walls disposed on the platform and arranged parallel said axis, and has friction enhancers transverse said axis.

10. A device as claimed in claim 9, in which said friction enhancers comprise ridges disposed on the top surface of the platform to improve friction against a wheel of a carrier supported on said platform.

11. A device as claimed in claim 8, in which the platform of said drive unit incorporates a housing at one end of the platform, said housing receiving the motor.

12. A device as claimed in claim 11, in which the motor is arranged with its rotational axis perpendicular to the platform and includes a crank having a pinion received in a slot in the base so that, as the crank is rotated by the motor, the platform is oscillated back and forth over said base.

13. A device as claimed in claim 12, in which a gearbox is interposed between said crank and motor to reduce the speed of rotation of the crank relative to the motor.

14. A device as claimed in claim 11, in which the motor is a dc motor, an electrical supply socket being disposed in said housing for connection thereto of one of a battery pack or a mains dc transformer output.

15. A device as claimed in claim 14, in which said battery pack is chargeable using said mains dc transformer output.

16. A device as claimed in claim 8, in which said base and platform of each unit each have a pair of facing parallel tracks, a ball cage being disposed between them and capturing at least four balls, two each between each of said facing tracks.

17. A device as claimed in claim 16, in which there are six balls, with three in each track.

18. A device as claimed in claim 16, in which said platform has depending bosses extending through slot guides in the base disposed parallel to said tracks, retaining plates being fixed to said bosses on the other side of said base and bearing against rear faces of said guide slots to retain said platform and base in contact with one another while permitting relative movement of said base and platform with respect to one another in said first direction.

19. A device as claimed in claim 18, in which said base has upstanding folds, in the top surface of which folds are disposed said slot guides.

20. A device as claimed in claim 16, in which the base has a base cover connected thereto and spaced therefrom and provided with an aperture having an upstanding lip, which aperture is sized to fit said ball cage within its range of movement.

21. A device as claimed in claim 20, in which said platform has a depending lip spaced closely from said base cover, which cover is sized to exceed the size of the platform throughout its entire range of movement relative to the base.

22. A device as claimed in claim 8, in which a grip mat is adhered or otherwise fixed to an underside of said base.

23. A device as claimed in claim 8, in which the bearings are not linear but allow the platform to move in an arc over the base.

24. A method as claimed in claim 1, employing a device in which the bearings are not linear but allow the platform to move in an arc over the base, in which the arc has a radius of rotation approximately equal to the wheel base of the carrier.

* * * * *